US012007858B2

(12) United States Patent
Balihaut et al.

(10) Patent No.: US 12,007,858 B2
(45) Date of Patent: Jun. 11, 2024

(54) ELECTRONIC COMPUTER, ELECTRONIC SYSTEM, METHOD FOR MONITORING THE EXECUTION OF AN APPLICATION AND ASSOCIATED COMPUTER PROGRAM

(71) Applicant: THALES, Courbevoie (FR)

(72) Inventors: Cedric Balihaut, Merignac (FR); Alexandre Fine, Merignac (FR); Sebastien Dotte, Merignac (FR); Philippe Besnier, Merignac (FR); Lionel Leroux, Merignac (FR)

(73) Assignee: THALES, Courbevoie (FR)

( * ) Notice: Subject to any disclaimer, the term of this patent is extended or adjusted under 35 U.S.C. 154(b) by 33 days.

(21) Appl. No.: 17/797,912

(22) PCT Filed: Feb. 12, 2021

(86) PCT No.: PCT/EP2021/053422
§ 371 (c)(1),
(2) Date: Aug. 5, 2022

(87) PCT Pub. No.: WO2021/160783
PCT Pub. Date: Aug. 19, 2021

(65) Prior Publication Data
US 2023/0153212 A1 May 18, 2023

(30) Foreign Application Priority Data
Feb. 14, 2020 (FR) ........................................ 2001472

(51) Int. Cl.
*G06F 11/16* (2006.01)
(52) U.S. Cl.
CPC ................................ *G06F 11/1641* (2013.01)

(58) Field of Classification Search
CPC .................................................. G06F 11/1641
See application file for complete search history.

(56) References Cited

U.S. PATENT DOCUMENTS 7,290,169 B2 * 10/2007 Safford ............... G06F 11/1679
714/49
7,933,966 B2 4/2011 Kondo et al.
(Continued)

FOREIGN PATENT DOCUMENTS

FR 2742015 A1 1/1998

OTHER PUBLICATIONS

French Search Report issued by the French Patent Office in corresponding French Application No. 2001472, dated Dec. 14, 2020.
(Continued)

*Primary Examiner* — Joseph R Kudirka
(74) *Attorney, Agent, or Firm* — ArentFox Schiff LLP (57) ABSTRACT

The invention relates to an electronic system with a built-in computer, designed to execute a source application in response to an external request. The capabilities of the system may include creating a clone of the source application by duplicating the application's executable, which is stored in a separate memory area. The system may then initiate an internal request to run the clone application. The original source and its clone may be executed independently, with the system generating a unified output by comparing the results of both the source and clone applications' execution. The invention provides for an approach to running and comparing software applications, enhancing computational efficiency and reliability.

8 Claims, 2 Drawing Sheets

(56) References Cited

U.S. PATENT DOCUMENTS

| | | | |
|---|---|---|---|
| 7,941,698 B1 | 5/2011 | Aggarwal et al. | |
| 10,331,529 B2 * | 6/2019 | Bose | G06F 11/1658 |
| 2001/0037445 A1 | 11/2001 | Mukherjee | |

OTHER PUBLICATIONS

International Search Report issued by the International Searching Authority in corresponding International Application No. PCT/EP2021/053422, dated May 14, 2021.

Shye, Alex, et al., "Using Process-Level Redundancy to Exploit Multiple Cores for Transient Fault Tolerance", 37th Annual IEEE/IFIP International Conference on Dependable Systmes and Networks, Jun. 1, 2007.

* cited by examiner

ELECTRONIC COMPUTER, ELECTRONIC SYSTEM, METHOD FOR MONITORING THE EXECUTION OF AN APPLICATION AND ASSOCIATED COMPUTER PROGRAM

CROSS-REFERENCE TO RELATED APPLICATIONS

The present Application for Patent is a National Stage Entry of International Application No. PCT/EP2021/053422, filed Feb. 12, 2021, which claims priority to French Application No. 20 01472, filed on Feb. 14, 2020, which are incorporated herein by reference in their entirety.

FIELD

The present invention relates to an electronic computer comprising at least one memory space and a data processing chain, the chain comprising at least one input/output processing entity of the computer, at least one processor configured to execute at least one software program called an application, and an operating system interacting with the input/output processing entity and said at least one processor.

The present invention also relates to an avionics system comprising such an electronic computer.

The present invention also relates to a method of monitoring the execution of an application on such an electronic computer, the method being implemented by such an electronic computer.

The present invention further relates to a computer program comprising software instructions which, when executed by a computer, implement such a method of monitoring the execution of an application on an electronic computer.

BACKGROUND

The present invention concerns electronic computers for critical systems, in particular computers dedicated to graphic applications, meeting criteria of reliability and also of size, weight and implementation flexibility, as used in aeronautical, land, rail, space, maritime and submarine transport, or in the field of energy (control of power stations in production or distribution, control of industrial process(es)) or robotics, fixed in immobile infrastructure (e.g. for air traffic control, airborne instrumentation, railway track management and switches) or embedded in a vehicle/mobile element between two distinct geographical points.

Currently, in order to meet reliability criteria, constraints are implemented at the level of the application to be executed by the computer and/or at the level of the system definition of this application, or even on the very definition of the computer implementing such an application by imposing a multiplication of its internal resources for comparison purposes for reliability validation. However, such constraints are in no way necessary for the final function of the application and only serve to compensate for a lack of reliability of the electronic computer as such.

Moreover, to meet reliability criteria, an addition of hardware resources contributing solely to heightening the reliability of the electronic computer's functional chain is generally implemented, which is a source of increase in the size and weight of the electronic computer, sometimes complex to implement, and even constituting an unnecessary burden when the need for reliability is not permanently required for the execution of the functional chain as such. In other words, currently a functional chain has an increased implementation cost due to reliability, whereas the reliability requirement associated with the functional chain is not always required.

SUMMARY

The aim of the invention is to propose an electronic computer and a method of monitoring the execution of an application on such an electronic computer which makes it possible to increase the reliability of the electronic computer without imposing constraints on the application and its design, or on the computer, or in terms of size, weight and power (SWaP).

For this purpose, the invention concerns an electronic system comprising at least an electronic computer, and an application(s) installation device, the electronic computer comprising at least one memory space and a data processing chain, the chain comprising at least:
- a computer input/output processing entity,
- at least one processor configured to run at least one software program called an application,
- an operating system interacting with the input/output processing entity and the at least one processor, the electronic computer, in the presence of an external request, intended for said at least one processor, to execute a source application whose executable has been previously loaded within a first dedicated area of the memory space of said computer, being at least configured to:
- instantiate at least one clone application of the source application by:
  - duplicating the executable of the source application to create the executable of the at least one clone application,
  - storing the executable of said at least one clone application in a second area of the memory space distinct from the first memory area dedicated to the source application, and by
  - generating a request, internal to the computer and intended for said at least one processor, to execute said at least one clone application,
- execute the source application and the at least one clone application independently of each other using said at least one processor,
- generate a single output based on a reliability result obtained by comparing the result of the execution of the source application with the result of the execution of the at least one clone application,
- the application(s) installation device being configured to make the source application clonable within the computer, the clonability of the source application being activatable/deactivatable depending on the desired reliability level of the source application and/or depending on the availability of said at least one processor of the computer,
- the installation device is configured to make the source application clonable by loading the executable of the source application into a first dedicated area of the electronic computer's memory space, and by configuring the computer's operating system to allocate, to each source and clone application:
  - a separate execution period and/or resource of said at least one processor, and
  - at least one separate input associated with a comparison indicator,
  - at least one separate output associated with said comparison indicator, the comparison indicator indicating that the execution results of the source and clone(s) applications associated with these indicators via their input, respectively output, should be compared.

The electronic system according to the present invention is then suitable to provide a tailored reliability increase by instantiating at least one clone application of the application whose execution reliability increase is desired. The source application and its clone are then run independently as two separate applications would be on the computer's computation chain, which both does not require the addition of hardware resources and is transparent to application design.

In other beneficial aspects of the invention, the electronic system comprises one or more of the following features, taken in isolation or in any technically possible combination:
- in case of inconsistency between the result of the execution of the source application and the result of the execution of the at least one clone application, the single output corresponds to a sanction command of said at least one processor, or,
- in case of consistency between the result of the execution of the source application and the result of the execution of the at least one clone application, the single output corresponds to the result of the execution of the source application or the result of the execution of said at least one clone application;
- the computer comprises a comparator independent of said at least one processor, the comparator being dedicated to perform:
  - said comparison of the result of the execution of the source application with the result of the execution of said at least one clone application delivering said reliability result, and
  - the generating of said single output based on said reliability result, said comparator being configured to apply said sanction command in case of inconsistency between the result of the execution of the source application and the result of the execution of said at least one clone application;
- the comparator is integrated within the input/output processing entity separate from said processor.
- said comparison indicator is used to detect the result of the execution of the source application, and the result of the execution of said at least one clone application, to be compared;
- the electronic system is an avionics system.

The invention also covers a method for monitoring the execution of an application on an electronic computer comprising at least one memory space and a data processing chain, the chain comprising at least:
- a computer input/output processing entity,
- at least one processor configured to run at least one software program called an application,
- an operating system interacting with the input/output processing entity and the at least one processor,
- the method being implemented by the electronic system comprising at least the electronic computer, and the application(s) installation device, the application(s) installation device being configure to make the source application clonable within the computer, the clonability of the source application being activatable/deactivatable depending on the desired reliability level of the source applications and/or depending on the availability of said at least one processor of the computer, the method comprising the following steps:
- loading the executable of the source application into a first dedicated area of the electronic computer's memory space, and by configuring the computer's operating system to allocate, to each source and clone application:
  - a separate execution period and/or resource of said at least one processor, and
  - at least one separate input associated with a comparison indicator,
  - at least one separate output associated with said comparison indicator,
  - the comparison indicator indicating that the execution results of the source and clone(s) applications associated with these indicators via their input, respectively output, should be compared,
- receiving an external request, intended for said at least one processor, to execute a source application whose executable has been previously loaded within a first dedicated area of the memory space of said computer,
- instantiating at least one clone application of the source application by:
  - duplicating the executable of the source application to create the executable of the at least one clone application,
  - storing the executable of said at least one clone application in a second area of the memory space distinct from the first memory area dedicated to the source application, and by
  - generating a request, internal to the computer and intended for said at least one processor, to execute said at least one clone application,
- executing the source application and the at least one clone application independently of each other using said at least one processor,
- generating a single output based on a reliability result obtained by comparing the result of the execution of the source application with the result of the execution of the at least one clone application.

A further object of the invention is a computer program comprising software instructions which, when executed by a computer, implement a remote method for executing an application on an electronic computer as defined above.

BRIEF DESCRIPTIONS OF THE DRAWINGS

These features and advantages of the invention will appear more clearly upon reading the following description, given solely as a non-limiting example, and made in reference to the attached drawings, in which.

DETAILED DESCRIPTION

Figure 1:
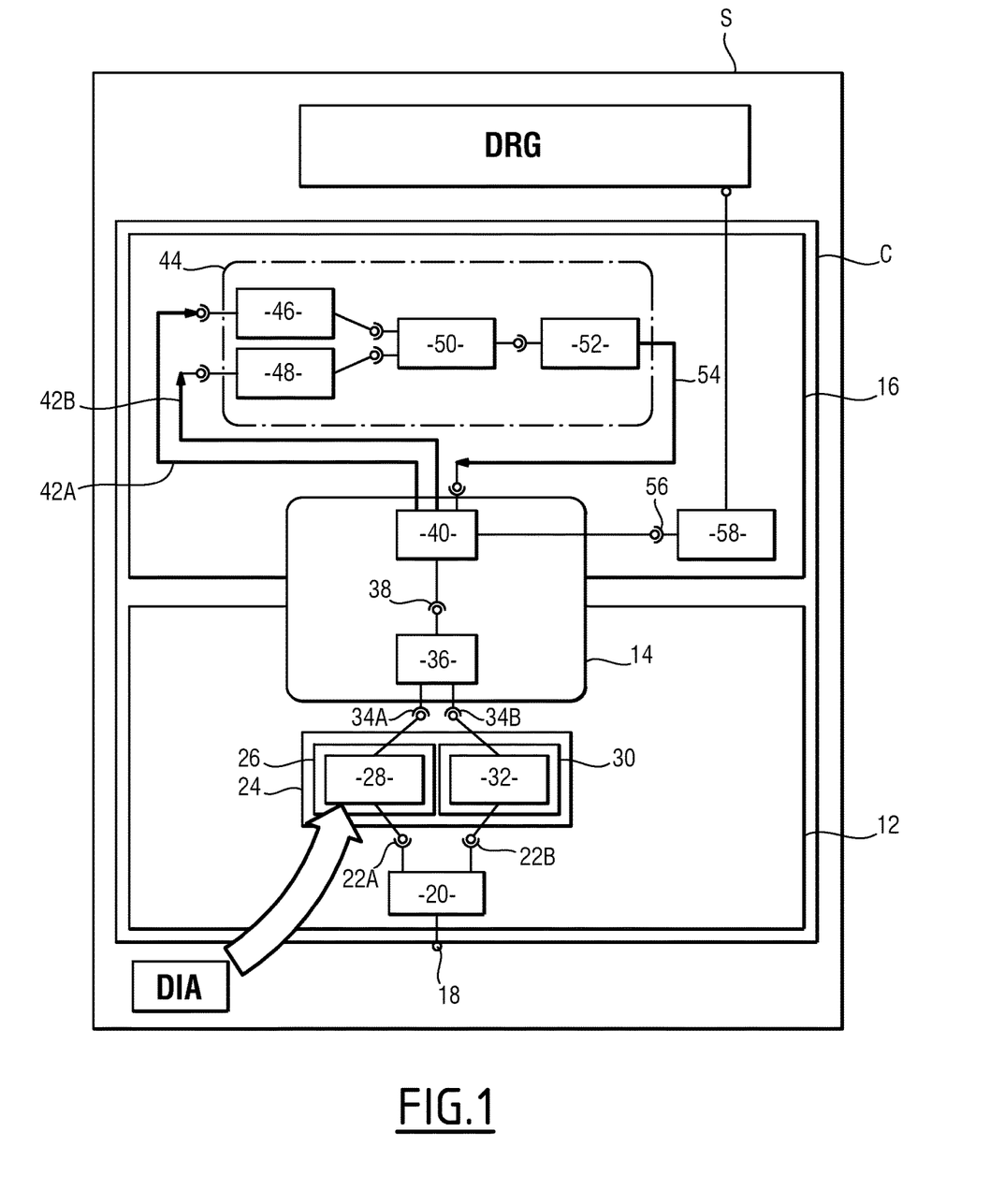
FIG. 1 is a schematic view of the hardware components of an electronic system according to the invention.

In the example shown in FIG. 1, the electronic system S according to the present invention comprises an electronic computer C and an application installation device DIA. In addition, optionally, especially when the computer is dedicated to graphical applications, the system S also comprises a graphics rendering device DRG. In particular, such an electronic system S is an avionics system, especially used in IMA (Integrated Modular Avionics) architectures.

From a hardware point of view, the electronic computer C corresponds, for example, to a generic hardware and software platform comprising one or more CPU(s) (Central Processing Unit) 12, an output delivery module 14 and one or more hardware I/O (input/output) entities 16 of the computer C, the output delivery module 14 being connected both to the processor(s) and to the hardware I/O entity(-ies) 16.

From a software point of view, the computer C further comprises an operating system, not shown, interacting with the processor(s) 12 and one or more hardware I/O entities 16 of the computer C.

According to the present invention, the application installation device DIA is configured to make a source application clonable within the electronic computer C, the clonability of the source application being activatable/deactivatable depending on the desired reliability level of the source application and/or depending on the availability of one or more CPUs 12 of the electronic computer C.

More specifically, the application installation device DIA is configured to make the source application clonable by loading the executable of the source application into a first dedicated area of the electronic computer's C memory space, and by configuring the electronic computer's C operating system to allocate, to each source application and clone(s):

a separate period of execution and/or processor resource(s) 12, and
   at least one separate input associated with a comparison indicator,
   at least one separate output associated with the comparison indicator.

Such an allocation is transparent to the source application, which has no knowledge of the allocation and the subsequent comparison between the execution results of the source application and its clone.

In other words, the application installation device DIA is both responsible for installing the applications, in particular those that can be cloned according to the present invention, in the electronic computer C, and for parameterising the operating system of the electronic computer C in order to make them work within the electronic computer C, automatically and transparently. The source application and its clone are then, according to the present invention, in effect run by the electronic computer C independently as two separate applications would be on the electronic computer's computation chain, which both does not require the addition of hardware resources and is transparent to application design.

In particular, the application installation device DIA is able to set up the management of the various inputs/outputs by the operating system to allocate inputs/outputs (read and write) for each source and clone instance of the same application, as if it had instantiated two different applications, except that the application installation device DIA indicates in the configuration of the cloneable application that its inputs/outputs are inputs/outputs of identical applications, i.e. source and clone, so that the electronic computer C detects that the application is cloneable and implements an adapted processing described below.

Furthermore, the application installation device DIA is designed to check that the constraints specific to the management of cloneable applications are respected, which amounts to checking a set of rules in order to guarantee the execution environment of the cloneable application(s), and to avoid possible side effects.

According to the illustration in FIG. 1, the installation device DIA is separate from the electronic computer C, i.e. outside the housing of the electronic control unit C (i.e. "disembedded").

According to a variant not shown, the installation device DIA is embedded, or even fully integrated, within the electronic computer C. In this case, the electronic system S comprises, for example, two entities, namely on the one hand the electronic computer C which embeds the installation device DIA, and on the other hand the graphic display device DRG.

As illustrated by FIG. 1, the architecture of the electronic computer C according to the present invention is advantageously a simplex architecture, i.e. a simple direct chain without looping or duplication of physical resources, and in particular a simplex IMA architecture capable of guaranteeing the non-interference of a given application with another distinct application.

According to the present invention, the electronic computer C, in the presence of an external request, intended for the processor 12, for the execution of a source application whose executable has been previously loaded within a first dedicated area of the memory space, not shown, of said electronic computer C, is at least suitable for:

instantiating at least one clone application of the source application by:
      duplicating the executable of the source application to create the executable of the at least one clone application,
      storing the executable of said at least one clone application in a second area, not shown, of the memory space distinct from the first memory area dedicated to the source application, and by
      generating a request, internal to the computer and intended for the processor, to execute said at least one clone application,
   executing the source application and the at least one clone application independently of each other using said processor,
   generating a single output based on a reliability result obtained by comparing the result of the execution of the source application with the result of the execution of the at least one clone application.

Such duplication of the source application when it is executed is transparent from the point of view of the source application itself.

According to an optional particular aspect, in order to limit the system-level constraints of the installation device DIA as well as of the electronic system S, intrinsic synchronisation points as disclosed, for example, within the patent application FR 2 742 015 A1, are used in the implementation of the electronic computer C.

To this end, as illustrated in FIG. 1, the electronic computer C comprises an input port 18 connected to a module 20 for managing the input(s) of the processor(s) 12. According to a particular aspect, such a module 20 for managing the input(s) of the processor(s) 12 corresponds to an IO (Input/Output) server of an electronic computer of an avionics system having an IMA architecture whose role is classically quite different, namely to factorise the task of acquiring data, while offering an abstraction of the physical layer, and then to make them available to the applications consuming said data.

In the presence of an external request to execute a source application made clonable by the application installation device DIA and whose executable has been previously loaded (as represented by the arrow), by the application installation device DIA, within a first dedicated area of the memory space not shown, of the electronic computer C, the module 20 for managing the input(s) of the processor(s) 12 in interaction with the operating system not shown is able to detect that the source application has been made clonable and consequently allocates two distinct inputs 22A and 22B to the input of an entity 24 of processor 12 core(s).

Specifically, input 22A is the input allocated to the source application and is associated with a first source application comparison indicator to indicate to processor 12 that input 22A should be used to execute the source application. Similarly, input 22B is the input allocated to the source application clone and is associated with a second source application comparison indicator to indicate to processor 12 that input 22B should be used to execute the source application clone.

According to a particular aspect the first comparison indicator and the second comparison indicator are identical and only allow to identify that the execution results of the applications associated with these indicators via their input (respectively output) are to be compulsorily compared.

Alternatively, the first comparison indicator and the second comparison indicator are distinct, for example by means of double marking, and then allow both the identification that the execution results of the applications associated with these indicators via their input (respectively output) must be compared, and the traceability of the path of these results throughout the functional chain of the electronic computer C.

Regardless of whether the first comparison indicator and the second comparison indicator are distinct or identical, they are subsequently used to detect the result of the execution of the source application, and the result of the execution of said at least one clone application, to be compared.

According to the example of FIG. 1, the computer C is a multi-core processor machine comprising a first core 26 allocated according to the present invention to the execution of the source application 28 and a second core 30 allocated to the execution of the clone application 32.

Such a processor 12 core entity 24 allows the source application 28 and said at least one clone application 32 to run independently of each other using said processor 12, simultaneously in parallel.

In other words, the input management module 20, corresponding in particular to an IO server, previously configured via the application installation device DIA, allows two applications, namely the source application 28 and the clone application 32, to use the same input port 18, whereas by nature, this is conventionally not possible/intended for certain input/output typologies.

In particular, the input received at the input port 18, for example, is so-called "sampled", where each new, more recent input value overwrites the previous one without it mattering, and can also be read several times, and/or by several consumers, without any functional effect, the input management module 20, corresponding in particular to an IO server, is configured to preferentially duplicate such a sampled input in two distinct memory areas not shown, one for each source application 28 and clone 32.

Alternatively, a common memory area accessible to run each source application 28 and clone 32 is implemented in a degraded mode of implementation as in some cases there are side effects potentially detrimental to the required reliability needs.

According to another example, for an input, for example, said to be "queuing", where each new input value supplements the previously received input value, the input management module 20, corresponding in particular to an IO server, is configured to completely double the management logic for this type of input, which includes implementing a logic for consuming such a complex input, independent for each source application 28 and clone 32, and therefore a double memory area associated with such a double consumption logic (a consumption logic associated with the source application 28 and a consumption logic associated with the clone application).

In other words, for this example of "queueing" input, the input management module 20, corresponding in particular to a server 10, is configured in order, on the one hand, to implement for the source application 28, a first logic for managing and consuming the sequence of values of this "queueing" input received from the outside world, via the input port 18, in order to guarantee that each message is indeed received, and in the right order, by the consuming source application 28, and for on the other hand, implementing for the clone application 32 a second logic for managing and consuming the sequence of values of this same "queueing" input received from the outside world, via the input port 18, in order to guarantee that each message is well received, and in the right order, by the consuming clone application 32.

Thus, the input management module 20, corresponding in particular to an IO server, allows, from a single input received via the input port 18, an automatic and transparent adaptation of the data/inputs consumed respectively by the source application 28 and by the clone application 32.

It should be noted that according to the present invention, the input management module 20, corresponding in particular to an IO server, is solely dedicated to the management of the inputs associated with each source application 28 and clone application 32, and does not intervene for the management of the result 34A of the execution of the source application 28 and the result 34B of the execution of the clone application 32.

In a first alternative, not shown, the processor 12 is single-core, and the execution of the source application and the clone application are serialized and executed independently of each other using separate execution periods.

According to a second alternative, not shown, the electronic computer C comprises a plurality of distinct processors completely independent of each other, and the execution of the source application and the clone application are implemented in parallel on each of these distinct processors and independently of each other as two distinct applications would be on the computer's computing chain.

According to a third alternative, not shown, the processor 12 of the electronic computer C corresponds to software infrastructure based on at least two virtual machine(s) with capacities of independence of these virtual machines, two distinct and independent virtual machines then hosting according to the invention the execution of the source application on a first virtual machine and the execution of the application.

Whatever the alternative, it should be noted that according to the present invention, the hardware resources are not multiplied/increased for reliability purposes because the invention consists instead in optimising their use to execute a clone application of a source application as two distinct applications would normally be executed, the clonability of the source application being advantageously activatable/deactivatable according to the present invention as a function of the desired level of reliability of the source application and/or as a function of the availability of the computing resources.

According to the example of FIG. 1, in particular based on implementation within an IMA (Integrated Modular Avionics) avionics architecture, the result 34A of the execution of the source application 28 and the result 34B of the execution of the clone application 32 are then transmitted by the processor 12 core entity 24 to the output supply module 14 which succeeds the processor 12 in the functional execution chain of the electronic computer C.

According to the present invention, as configured by the installation device DIA, the result 34A of the execution of the source application 28 is the output allocated to the source application and is associated with a first comparison indicator of the source application, making it possible to indicate to the elements following the processor 12 in the computing chain of the electronic computer C that this result 34A must be associated with the source application. Similarly, the result 34B of the execution of the clone application 32 is the output allocated to the clone application of the source application and is associated with a second comparison indicator of the source application to indicate to the elements following the processor 12 in the computing chain of the electronic computer C that this result 34B should be associated with the clone application.

As previously indicated, whether the first comparison indicator and the second comparison indicator are distinct or identical, they are used subsequently to detect the result 34A of the execution of the source application, and the result 34B of the execution of said at least one clone application, to be compared, in particular after a preliminary shaping process by the output supply module 14.

In particular, the result 34A of the execution of the source application 28 and the result 34B of the execution of the clone application 32 are transmitted as input to the input/output driver 36 of the output supply module 14, which transmits them, optionally accompanied by other miscellaneous predetermined data, within a transmission channel 38 to an input/output interface and management tool 40, which is itself configured, in particular in accordance with an IMA avionics architecture, to supply two distinct and independent sets of data 42B and 42A, of a form adapted to the needs of the input/output processing entity 16 and not dependent on constraint(s) linked to the execution of the source application 28 or to the execution of the clone application 32, and respectively associated with the result 34A of the execution of the source application 28 and with the result 34B of the execution of the clone application 32B, at the input of a comparator 44 which is independent of the processor 12 (independent here means that the comparator 44 is physically distinct from the processor (i.e. outside the processor) but, as illustrated in FIG. 1, can be integrated within the same product, namely the electronic computer C, or even on the same electronic board as that on which the processor 12 is located.

Preferably, as illustrated in FIG. 1, the comparator 44 is integrated within the input(s)/output(s) processing entity 16 separate from said processor 12, and corresponds to a modified comparator, with respect to the comparator already present within the existing input(s)/output(s) processing entity 16, for the purposes of the invention, so as to be specifically configured to compare the result of two applications resulting from application cloning. It should be noted that the modification of such a comparator does not modify the existing architecture of the electronic computer C, nor that of the existing input/output processing entity 16. Thus, the hardware implementation according to the invention of the comparison between the result 34A of the execution of the source application 28 and the result 34B of the execution of the clone application 32 does not involve additional resources.

In other words, according to the present invention, the comparator 44 autonomously implements a comparison without knowledge of the applications and their function and using resources different from those used by the applications, the comparison indicator only allowing to detect that the result of two distinct applications are to be compared but not allowing the independent comparator 44 to identify that these two results were obtained from a source application and its clone. In other words, the comparison indicator indicates that two applications are to be compared, but does not allow the comparator 44 to identify the nature of the application. The comparator 44, independent of the processor 12, implements such a comparison as if it were comparing the execution result of two distinct applications X and Y (i.e. applications X and Y are "non-clones" of each other), i.e. without any knowledge of the applications, of their function, nor according to the present invention of their clonability. At the same time, the cloned source application has no "awareness" of the fact that it is being cloned by the installation device DIA, nor does it have any knowledge of the comparison of its execution result with that of its clone.

Such a comparator 44 corresponds to an output validation cell allowing the generation of a single output to the world outside the electronic computer C, such an output, combined with the execution of the source application made clonable, advantageously being more reliable according to the present invention.

This is because if there is an inconsistency between the result 34A of the execution of the source application 28 and the result 34B of the execution of the at least one clone application 32, the single output corresponds to a sanction command of said at least one processor 12. Furthermore, in the event of consistency between the result 34A of the execution of the source application 28 and the result 34B of the execution of the at least one clone application 32, the single output corresponds to the result of the execution of the source application or the result of the execution of said at least one clone application (i.e. the result of the execution of the source application and the result of the execution of the at least one clone application are merged into a single output).

In other words, the comparator 44 is dedicated to comparing the result 34A of the execution of the source application 28 with the result 34B of the execution of said at least one clone application 32, said comparison providing a reliability result, and to generating said single output according to the reliability result, said comparator 44 being configured to apply said sanction command in case of inconsistency between the result of the execution of the source application and the result of the execution of said at least one clone application.

For this purpose, the comparator 44 comprises, for example as shown in FIG. 1, at least two signature processors 46 and 48. The signature processor 46 is, according to the example of FIG. 1, dedicated to signing the data set 42A associated with the result 34A of the execution of the source application 28, while the signature processor 48 is dedicated to signing the data set 42B associated with the result 34B of the execution of the clone application 32.

The signatures generated by each of the signature processors 46 and 48, respectively associated with the source application 28 and the clone application 32, are provided to a signature comparator 50 delivering the reliability result previously mentioned, namely corresponding to an inconsistency between the two signatures or a consistency between these two signatures. Such a reliability result is then processed by a sanction filter 52 to detect whether the reliability result is consistent or inconsistent.

Such a sanction filter 52 of the comparator 44 is configured to transmit to the interface and management tool 40 of the output provision module 14 the status 54 of the filtering performed.

According to this status 54, the interface and management tool 40 of the output provision module 14 generates the unique output 56 corresponding to: a sanction command in case of inconsistency between the result 34A of the execution of the source application 28 and the result 34B of the execution of said at least one clone application 32, or to the result of the execution of the source application or to the result of the execution of said at least one clone application in case of consistency between the result 34A of the execution of the source application 28 and the result 34B of the execution of said at least one clone application 32.

As previously indicated, the comparator 44 is integrated within the input(s)/output(s) processing entity 16 distinct from said processor 12, and corresponds to a comparator already present within the existing input/output processing entity 16, the sanction management (i.e. the error management mechanism within the functional chain of the electronic computer C) according to the present invention does not therefore require additional resources and allows a simplex architecture to be retained.

This single output 56 is provided by the interface and management tool 40 to the "outside world" via an output processing line 58, and in particular when the source application 28 is a graphics application to the graphics rendering device DRG.

It is therefore understood from the preceding description that an application made clonable does not carry any constraints imposed by the electronic system S comprising the application installation device DIA and the electronic computer C according to the invention.

Figure 2:
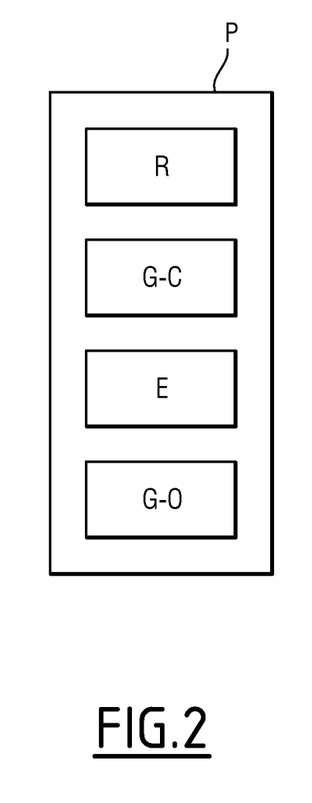
FIG. 2 is a flowchart of a method for monitoring according to the invention, the method being implemented by the electronic computer of the electronic system of FIG. 1.

The operation of the electronic computer C, according to one example of an embodiment of the invention, will now be described with the help of FIG. 2 illustrating a flow chart of the process P for monitoring the execution of an application implemented automatically by the electronic computer C.

According to a first step R, the electronic computer C receives an external request, intended for said at least one processor 12, to execute a source application whose executable has been previously loaded, in particular by the installation device DIA, within a first dedicated area of the memory space of said electronic computer C.

According to a second step G-C, the electronic computer C instantiates at least one clone application of the source application by duplicating the executable of the source application to create the executable of said at least one clone application, and by storing the executable of said at least one clone application in a second area of the memory space distinct from the first memory area dedicated to the source application, and by generating a request, internal to the electronic computer C and intended for said at least one processor 12, for execution of said at least one clone application.

According to a third step E, the electronic computer C, executes the source application 28 and said at least one clone application 32 independently of each other using for example as illustrated in FIG. 1 respectively the first core 26 and the second core 28 of the processor 12.

According to a last step G-O, the electronic computer C generates a unique output according to a reliability result obtained by comparing, in particular via the comparator 44 of FIG. 1, the result of the execution of the source application 28 and the result of the execution of said at least one clone application 32.

It is thus conceived that the electronic computer C, like the electronic system S comprising it as well as the application installation device DIA and the method according to the invention, increases the reliability of execution of an application, and by its structure is suitable for integrating transient events such as the single-event effects (SEE) associated with the radiative environment of the hardware components of the electronic computer C (neutrons, radiation). To do this, the present invention cleverly uses, as indicated above, properties, in particular IMA, of guaranteeing spatial and/or temporal segregation and total independence of the multiple applications suitable for being hosted on the electronic computer C. In other words, the infrastructure of the electronic computer C as configured by the installation device DIA guarantees the full and complete independence of execution of the source application and its clone.

To do this, the electronic computer C, configured by means of the installation device DIA, is suitable firstly for multiply executing in an autonomous manner (i.e. automatically without human intervention) the same application made clonable on two spatially and/or temporally different resources, whilst limiting to the extent possible the identical use of common resources, and then secondly for checking, by means of a comparator 44 independent of the processor 12, the consistency of this multiple execution of the same application, and in the event of inconsistency, for sanctioning the activity of the processor 12, in order to avoid any propagation of the result of the execution of the application which has been made clonable.

Such multiple execution and checking are transparent to the cloned application, because seen from the outside (i.e. from the "outside world") of the electronic computer C, only one input is provided and only one output is delivered, in a strictly identical way to what is obtained for a current simplex application execution, but advantageously according to the present invention the single output associated with the cloned application is more honest.

In addition, the present invention provides a robust reliability mechanism solution for covering, locating and identifying permanent or transient failures occurring only during application execution. According to the present invention, in order to create an undetected error when running a cloneable application (i.e. when the application has a high reliability requirement) two to three separate failures are now required as opposed to sometimes only one with a conventional electronic C-computer. Indeed, the possibility of a common mode failure between the execution of the source application and the execution of the clone application is rendered negligible or even eliminated thanks to the specific architecture mentioned above implemented according to the present invention to make these two executions independent. Moreover, the non-detection of an error implies an error within two distinct physical entities of the electronic computer C according to the present invention, namely the processor 12 and the input(s)/output(s) processing entity 16 comprising the comparator 44, and not one or more errors within the same physical entity of a conventional electronic computer C.

According to the present invention the reliability enhancement of an application is configurable and scalable, which allows for high reusability, for example from one carrier to another in an avionics context. Indeed, the clonability of an application is easily activated/deactivated by the application installation device DIA, which optimises the resources available for the applications according to this activation (100% of the resources physically present can be used for the applications, with complete transparency and without any change). Thus, there are no resources completely dedicated to reliability augmentation since when the clonability of an application is not activated (i.e. when a high reliability requirement is not needed for that application) the resources allocated to a clone are free and usable for other applications.

As previously mentioned, the simplex architecture of the electronic computer C according to the present invention is retained in order to limit its size, weight and power (SWaP), and the solution according to the present invention is suitable for integration with little impact on a simplex architecture in accordance with an existing architecture, or even an existing architecture, by the configuration implemented by the installation device DIA.

The invention claimed is:

1. An electronic system comprising at least one electronic computer, and an application(s) installation device, the at least one electronic computer comprising at least one memory space and a data processing chain, the data processing chain comprising at least:
   a computer input/output processing entity,
   at least one processor configured to run at least one application, and
   an operating system interacting with the input/output processing entity and the at least one processor,
   the at least one electronic computer, in a presence of an external request, configured for said at least one processor, to execute a source application whose executable has been previously loaded within a first dedicated area of the at least one memory space of said at least one electronic computer, said at least one electronic computer being at least configured to:
   instantiate at least one clone application of the source application by:
      duplicating the executable of the source application to create an executable of the at least one clone application,
      storing the executable of said at least one clone application in a second area of the memory space distinct from the first dedicated area, and
      generating a request, internal to the at least one electronic computer and configured for said at least one processor, to execute said at least one clone application,
   execute the source application and the at least one clone application independently of each other using said at least one processor, and
   generate a single output based on a reliability result obtained by comparing a result of the execution of the source application with a result of the execution of the at least one clone application,
   the application(s) installation device being configured to make the source application clonable within the at least one electronic computer, a clonability of the source application being activatable/deactivatable depending on a desired reliability level of the source application or depending on an availability of said at least one processor of the at least one electronic computer, and
   the installation device being configured to make the source application clonable by loading the executable of the source application into the first dedicated area, and by configuring the operating system to allocate, to each source and a clone application:
      a separate execution period or resource of said at least one processor,
      at least one separate input associated with a comparison indicator, and
      at least one separate output associated with said comparison indicator,
      the comparison indicator indicating that the execution results of the source application and the at least one clone application associated with indicators via an input, respectively output, are to be compared.

2. The electronic system according to claim 1, wherein:
   in case of an inconsistency between the result of the execution of the source application and the result of the execution of the at least one clone application, the single output corresponds to a sanction command of said at least one processor, or,
   in case of a consistency between the result of the execution of the source application and the result of the execution of the at least one clone application, the single output corresponds to the result of the execution of the source application or the result of the execution of said at least one clone application.

3. The electronic system according to claim 2, wherein the at least one electronic computer comprises a comparator independent of said at least one processor, the comparator being configured for:
   said comparison of the result of the execution of the source application with the result of the execution of said at least one clone application delivering said reliability result, and
   the generating of said single output based on said reliability result,
   said comparator being configured to apply said sanction command in case of the inconsistency between the result of the execution of the source application and the result of the execution of said at least one clone application.

4. The electronic system of claim 3, wherein the comparator is integrated within the computer input/output processing entity separate from said at least one processor.

5. The electronic system according to claim 1, wherein said comparison indicator is used to detect the result of the execution of the source application, and the result of the execution of said at least one clone application, to be compared.

6. The electronic system according to claim 1, wherein the electronic system is an avionics system.

7. A method for monitoring execution of an application on an electronic computer comprising at least one memory space and a data processing chain, the chain comprising at least:
   a computer input/output processing entity,
   at least one processor configured to run the application, and
   an operating system interacting with the computer input/output processing entity and the at least one processor,
   the method being implemented by an electronic system comprising at least the electronic computer and an application(s) installation device, the application(s) installation device being configured to make a source application clonable within the electronic computer, a clonability of the source application being activatable/deactivatable depending on a desired reliability level of the source application or depending on an availability of said at least one processor of the electronic computer, the method comprising:

loading an executable of the source application into a first dedicated area of the at least one memory space, and by configuring the operating system to allocate, to each source and a clone application:
- a separate execution period or resource of said at least one processor,
- at least one separate input associated with a comparison indicator, and
- at least one separate output associated with said comparison indicator, the comparison indicator indicating that execution results of a source and a clone(s) applications associated with indicators via an input, respectively output, are capable of being compared, receiving an external request, configured for said at least one processor, to execute the source application whose executable has been previously loaded within the first dedicated area, instantiating at least one clone application of the source application by:
- duplicating the executable of the source application to create an executable of the at least one clone application,
- storing the executable of said at least one clone application in a second area of the at least one memory space distinct from the first dedicated area, and
- generating a request, internal to the electronic computer and configured for said at least one processor, to execute said at least one clone application, executing the source application and the at least one clone application independently of each other using said at least one processor, and generating a single output based on a reliability result obtained by comparing a result of the execution of the source application with a result of the execution of the at least one clone application.

8. A non-transitory computer-readable medium including a computer program comprising software instructions which, when executed by a computer, implement a method for monitoring the execution of the application on the electronic computer according to claim 7.

* * * * *